US012032312B2

(12) United States Patent
Endo

(10) Patent No.: US 12,032,312 B2
(45) Date of Patent: Jul. 9, 2024

(54) CONNECTOR MEMBER

(71) Applicant: TOSHIBA TEC KABUSHIKI KAISHA, Tokyo (JP)

(72) Inventor: Sasuke Endo, Chigasaki Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/579,483

(22) Filed: Jan. 19, 2022

(65) Prior Publication Data

US 2023/0229103 A1 Jul. 20, 2023

(51) Int. Cl.
*G03G 15/20* (2006.01)

(52) U.S. Cl.
CPC ................................ *G03G 15/2053* (2013.01)

(58) Field of Classification Search
CPC ....................... G03G 15/2017; G03G 15/2053
See application file for complete search history.

(56) References Cited

U.S. PATENT DOCUMENTS

2013/0302060 A1* 11/2013 Moriya .................. G03G 15/80
399/90
2013/0336672 A1* 12/2013 Mizuta ............... G03G 15/2053
439/700
2014/0105634 A1 4/2014 Tanaka et al.
2018/0326733 A1 11/2018 Arakane

FOREIGN PATENT DOCUMENTS

JP 2018-151591 A 9/2018
JP 2021-012295 A 2/2021

* cited by examiner

*Primary Examiner* — Thomas S Giampaolo, II
(74) *Attorney, Agent, or Firm* — Kim & Stewart LLP

(57) ABSTRACT

A connector member connectable to a heating unit inside a heating roller of a fixing device includes a cover having a recess into which an end of a substrate of the heating unit in a first direction parallel to a rotation axis of the heating roller can be inserted, and an energizing terminal stored in the cover and including a contact portion on one side of the recess and to be in contact with a contact point on the substrate, and a connecting portion to which a conducting wire for receiving electric power is connected and located on the other side of the recess.

20 Claims, 9 Drawing Sheets

CONNECTOR MEMBER

FIELD

Embodiments described herein relate generally to a connector member and a fixing device including the connector member.

BACKGROUND

A fixing device used in a printer has a pressure roller and a rotatable cylindrical film between which a sheet is conveyed and heated so that toner is fixed thereto. For example, a heating unit is disposed along the inner surface of the cylindrical film such that the generated heat is conveyed to the sheet. The heating unit is energized via a connector member connected to an outer power source. Since the cylindrical film rotates during printing, the connector member needs to be securely connected to the heating unit.

DETAILED DESCRIPTION

In general, according to one embodiment, a connector member connectable to a heating unit inside a heating roller of a fixing device includes a cover having a recess into which an end of a substrate of the heating unit in a first direction parallel to a rotation axis of the heating roller can be inserted. The connector member further includes an energizing terminal stored in the cover and including a contact portion on a first side of the recess to contact a contact point on the substrate, and a connecting portion to which a conducting wire for receiving electric power is connected. The connecting portion is located on the second side of the recess.

Hereinafter, a connector member to certain embodiments will be described with reference to the drawings.

Figure 1:
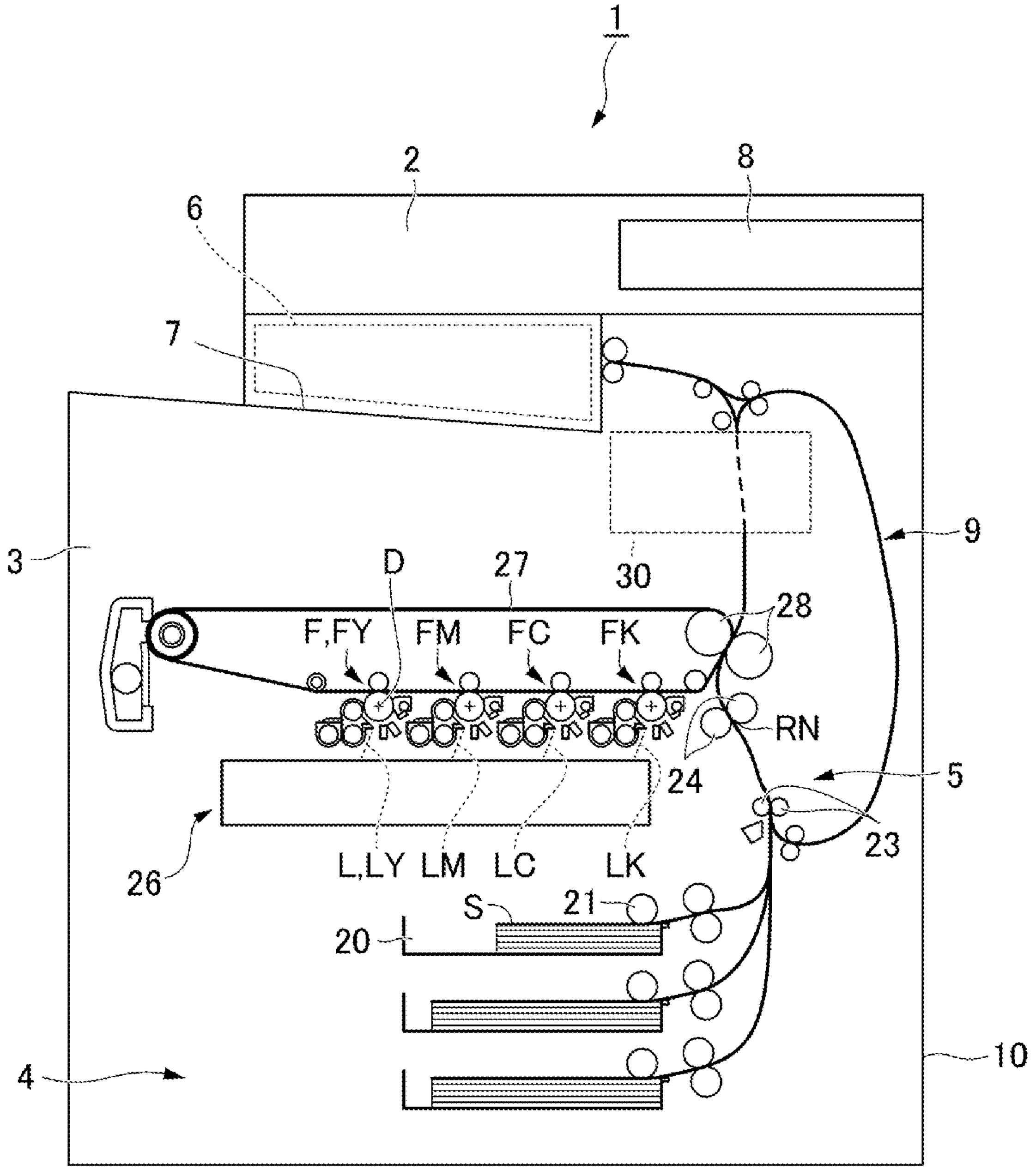
FIG. 1 is a schematic diagram of an image forming apparatus.

FIG. 1 is a schematic diagram of an image forming apparatus 1. The image forming apparatus 1 performs an image forming process on a sheet S. The sheet may be paper or the like. The image forming apparatus 1 comprises a scanner unit 2, an image forming unit 3, a sheet supply unit 4, a conveyance unit 5, a control unit 6, a catch tray 7, a control panel 8, a reversing unit 9, and a housing 10. The housing 10 forms the outer shape of the image forming apparatus 1.

The scanner unit 2 scans a document placed thereon and generates image data. The scanner unit 2 outputs the generated image data to the image forming unit 3.

The image forming unit 3 forms a toner image based on the image data received from the scanner unit 2 or an external device. The image forming unit 3 transfers the toner image onto the surface of the sheet S. The image forming unit 3 also heats and presses the toner image formed on the surface of the sheet S to fix the toner image to the sheet S.

The sheet supply unit 4 supplies the sheets S one by one to the conveyance unit 5 so the image forming unit 3 can form the toner image on the sheets at appropriate timing. The sheet supply unit 4 comprises a sheet feed tray 20 and a pickup roller 21. The sheet feed tray 20 stores the sheets S of a predetermined size and a predetermined type. The pickup roller 21 picks up the sheets S one by one from the sheet feed tray 20. With the sheet S picked up, the pickup roller 21 supplies the sheet S to the conveyance unit 5.

The conveyance unit 5 conveys the sheet S supplied from the sheet supply unit 4 to the image forming unit 3. The conveyance unit 5 comprises a conveyance roller 23 and a registration roller 24. The conveyance roller 23 conveys the sheet S supplied from the pickup roller 21 to the registration roller 24. The conveyance roller 23 causes the leading edge of the sheet S in the conveyance direction to abut against a nip RN of the registration roller 24. The registration roller 24 aligns the leading edge of the sheet S at the nip RN by pushing the sheet S against the nip RN. The registration roller 24 then conveys the sheet S in accordance with the timing of the image transfer to the sheet S by the image forming unit 3.

The image forming unit 3 will be described. The image forming unit 3 comprises a plurality of image forming portions F, a laser scanning unit 26, an intermediate transfer belt 27, a transfer unit 28, and a fixing device 30.

Each of the image forming portions F comprises a photoreceptor drum D. The image forming portion F forms a toner image on the photoreceptor drum D according to the image data. The image forming portions FY, FM, FC, and FK form toner images with yellow toner, magenta toner, cyan toner, and black toner, respectively.

Each of the image forming portions F further comprises a charger that electrostatically charges the surface of the corresponding photoreceptor drum D. The image forming portions F also include a developing unit that stores a developer containing yellow toner, magenta toner, cyan toner, or black toner. The developing unit supplies toner/developer to develop an electrostatic latent image that has been formed on the photoreceptor drum D.

The laser scanning unit 26 scans the charged photoreceptor drum D with laser light L to selectively expose the photoreceptor drum D according to the image data. The laser scanning unit 26 performs the exposure with different laser beams LY, LM, LC, and LK for forming the electrostatic latent images on the photoreceptor drums D of the image forming portions FY, FM, FC, and FK for the respective colors.

The toner image on the surface of the photoreceptor drum D is primarily transferred to the intermediate transfer belt 27. The transfer unit 28 transfers the toner image primarily transferred on the intermediate transfer belt 27 onto the surface of the sheet S at a secondary transfer position. The fixing device 30 heats and presses the toner image transferred to the sheet S to fix the toner image thereon.

The reversing unit 9 reverses the sheet S in order to form an image on the back surface of the sheet S. The reversing unit 9 reverses the sheet S discharged from the fixing device 30 by a switchback. The reversing unit 9 conveys the reversed sheet S back toward the registration roller 24. The printed sheet S is ejected onto the catch tray 7. The control panel 8 is a user input unit by which an operator can input instructions for operating the image forming apparatus 1. The control panel 8 comprises a touch panel and various hard keys in this example.

Figure 2:
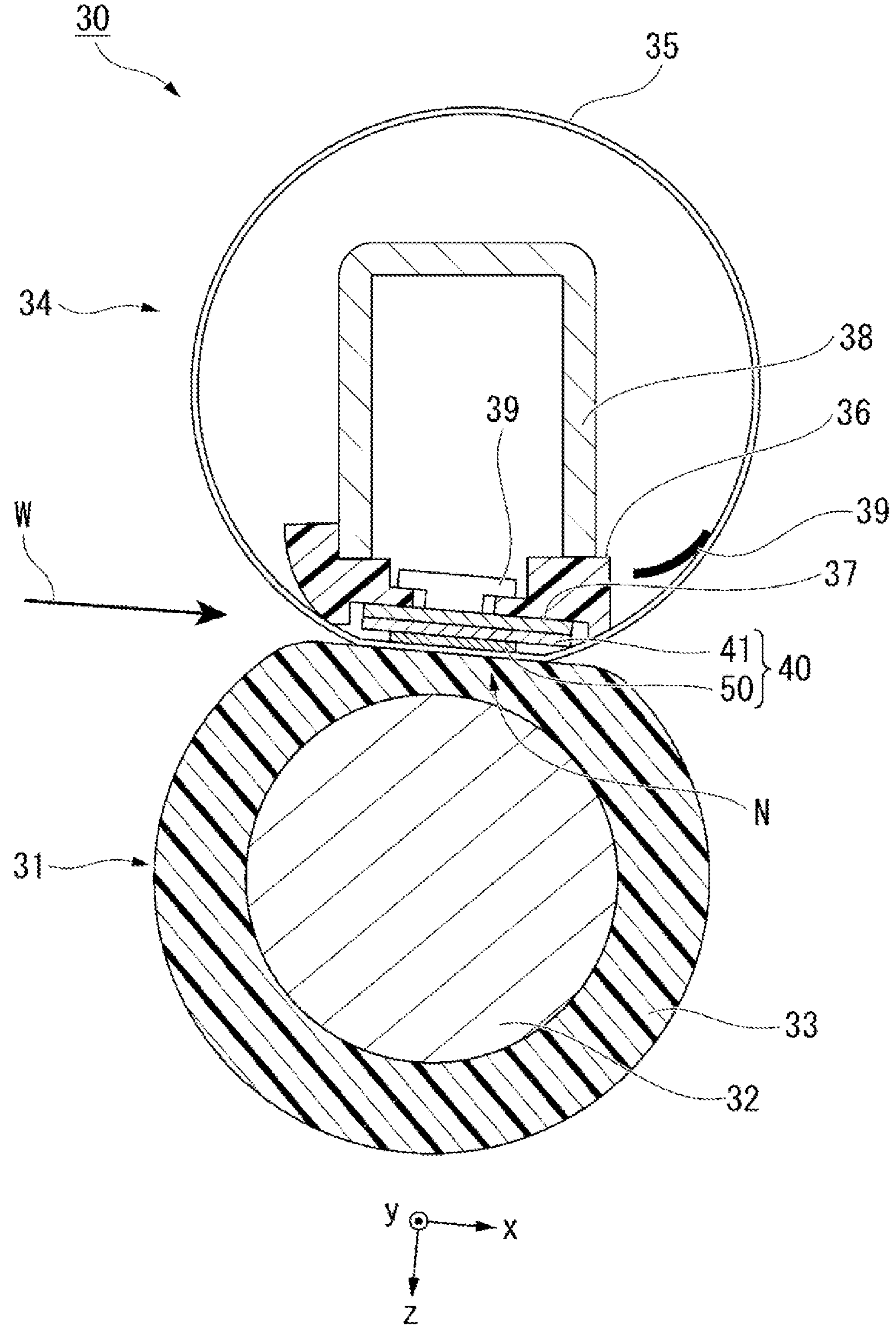
FIG. 2 is a cross-sectional view of a fixing device.

FIG. 2 is a front cross-sectional view of the fixing device 30. The fixing device 30 comprises a pressure roller 31 and a heating roller 34, both of which are rotatable. A nip N is formed between the pressure roller 31 and the heating roller 34.

The z, x, and y directions in the present application are defined as follows. The z direction is the thickness direction of a substrate 41 and the direction in which the heating roller 34 and the pressure roller 31 are arranged. The +z direction is the direction from the heating roller 34 toward the pressure roller 31. The x direction is the lateral direction of the substrate 41 and the conveyance direction of the sheet S in the nip N. The +x direction is the direction from the upstream side of the sheet S toward the downstream side in the conveyance direction. The y direction is the longitudinal direction of the substrate 41 and the axial direction of a tubular film 35 of the heating roller 34.

The pressure roller 31 presses the toner image on the sheet S that has entered the nip N. The pressure roller 31 comprises a core metal 32 and an elastic layer 33. The configuration of the pressure roller 31 is not limited to the above, and various configurations are possible.

The core metal 32 is formed in a columnar shape by a metal material such as stainless steel. The elastic layer 33 is formed of an elastic material such as silicone rubber. The elastic layer 33 has a constant thickness on the outer peripheral surface of the core metal 32. A release layer may be formed on the outer peripheral surface of the elastic layer 33. The release layer is formed of a resin material such as a tetrafluoroethylene-perfluoroalkyl vinyl ether copolymer (PFA).

The pressure roller 31 is driven by a motor to rotate. When the pressure roller 31 rotates, the tubular film 35 of the heating roller 34 also rotates while forming the nip N therebetween. The pressure roller 31 conveys the sheet S in a conveyance direction W at the nip N.

The toner image of the sheet S enters the nip N, and is heated by the heating roller 34. The heating roller 34 comprises the tubular film 35, a heating unit 40, a heat transfer member 37, a support member 36, a stay 38, and a temperature-sensitive element 39. The configuration of the heating roller 34 is not limited to the above, and various configurations are possible.

The tubular film 35 has a tubular shape. The tubular film 35 has a base layer, an elastic layer, and a release layer in this order from the inner peripheral side. The base layer is formed of a material such as nickel (Ni). The elastic layer is formed of an elastic material such as silicone rubber. The release layer is formed of a material such as PFA resin.

The heating unit 40 is inside the tubular film 35. The surface of the heating unit 40 in the +z direction comes into contact with the inner surface of the tubular film 35 via grease.

The heat transfer member 37 is formed of a metal material with high thermal conductivity such as copper. The outer shape of the heat transfer member 37 is the same as the outer shape of the substrate 41 of the heating unit 40. The heat transfer member 37 is disposed on the −z direction side of the substrate 41 and comes into contact with the substrate 41.

The support member 36 is formed of a resin material such as a liquid crystal polymer. The support member 36 is disposed so as to cover both sides in the x direction of the heating unit 40 and a side in the −z direction thereof. The support member 36 supports the heating unit 40 via the heat transfer member 37. The support member 36 supports the inner peripheral surface of the tubular film 35 in both end portions of the heating unit 40 in the x direction.

The stay 38 is formed of a steel plate material or the like. The cross section of the stay 38 perpendicular to the y direction is formed in a U shape. The stay 38 is mounted on the −z direction side of the support member 36 such that a U-shaped opening portion is covered by the support member 36. The stay 38 extends along the y direction. Both end portions of the stay 38 in the y direction are fixed to the housing 10 of the image forming apparatus 1.

The temperature-sensitive element 39 comprises a heater thermometer, a thermostat, and a film thermometer. The heater thermometer and the thermostat are disposed on the −z direction side of the heating unit 40 with the heat transfer member 37 interposed therebetween. The heater thermometer measures the temperature of the heating unit 40 via the heat transfer member 37. The thermostat shuts off the energization of a heating element 50 of the heating unit 40 if the temperature of the heating unit 40 detected via the heat transfer member 37 exceeds a predetermined temperature. The film thermometer comes into contact with the inner peripheral surface of the tubular film 35 and measures the temperature of the tubular film 35.

Figure 3:
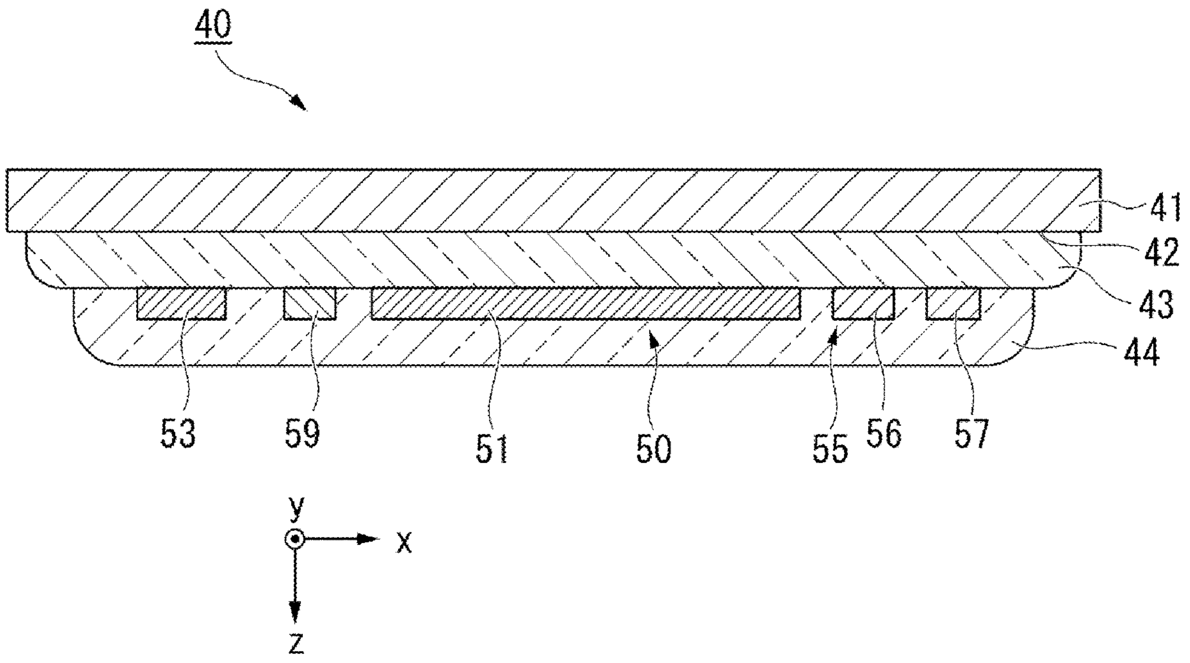
FIG. 3 is a cross-sectional view of a heating unit.
Figure 4:
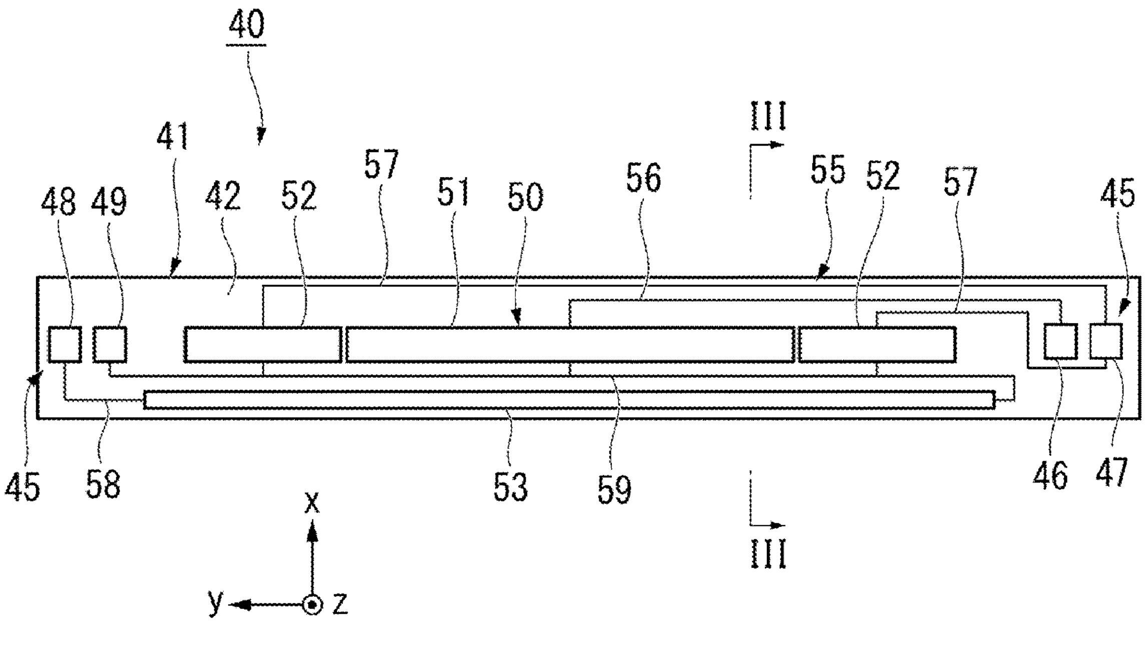
FIG. 4 is a bottom view of a heating unit.

The heating unit 40 will be described with reference to FIGS. 3 and 4. FIG. 3 is a cross-sectional view of the heating unit 40 taken along line III-III of FIG. 4. FIG. 4 is a bottom view of the heating unit 40. The heating unit 40 has the substrate 41, a plurality of heating elements 50 (51, 52, 53), a plurality of contact points 45 (46, 47, 48, 49), and a plurality of wirings 55 (56, 57, 58, 59).

The substrate 41 is formed of a material such as stainless steel, a ceramic material such as aluminum nitride, or the like. The substrate 41 has a long and thin rectangular plate shape. The longitudinal direction of the substrate 41 corresponds to the y direction, and the lateral direction of the substrate 41 corresponds to the x direction. As illustrated in FIG. 3, an insulating layer 43 formed of a glass material or the like is formed on a first surface 42 of the substrate 41 in the +z direction. Another insulating layer may be formed in the −z direction of the substrate 41 similarly to the insulating layer 43 formed in the +z direction of the substrate 41.

The heating elements 50 are formed of a silver-palladium alloy or the like. The heating elements 50 generate heat by being energized. The heating elements 50, the contact points 45, and the wirings 55 are disposed on the first surface 42 of the substrate 41 via the insulating layer 43. A protective layer 44 is formed of a glass material or the like so as to cover the heating elements 50 and the wirings 55. Another protective layer may be formed in the −z direction of the substrate 41 similarly to the protective layer 44 formed in the +z direction of the substrate 41.

As illustrated in FIG. 4, the heating elements 50 comprise a first heating element 51, a pair of second heating elements 52, and a third heating element 53. The first heating element 51 is in the middle portion of the substrate 41 in the y direction. The pair of second heating elements 52 are on both sides of the first heating element 51 in the y direction. The first heating element 51 and the pair of second heating elements 52 are in the middle portion of the substrate 41 in the x direction. The third heating element 53 is in the end portion of the substrate 41 in the −x direction. The third heating element 53 is long in the y direction. Both end portions of the third heating element 53 in the y direction are outside both y-direction end portions of the pair of second heating elements 52 in the y direction.

The contact points 45 comprise a first contact point 46, a second contact point 47, a third contact point 48, and a common contact point 49. The first contact point 46 and the second contact point 47 are in the end portion of the substrate 41 in the −y direction. The third contact point 48 and the common contact point 49 are in the end portion of the substrate 41 in the +y direction.

The wirings 55 comprise a first wiring 56, a second wiring 57, a third wiring 58, and a common wiring 59. The first wiring 56 interconnects the end portion of the first heating element 51 in the +x direction and the first contact point 46. The second wiring 57 interconnects the end portions of the pair of second heating elements 52 in the +x direction and the second contact point 47. The third wiring 58 interconnects the end portion of the third heating element 53 in the +y direction and the third contact point 48. The common wiring 59 interconnects the end portions of the first heating element 51 and the pair of second heating elements 52 in the −x direction, the end portion of the third heating element 53 in the −y direction, and the common contact point 49.

The control unit 6 performs energization between at least one of the first contact point 46, the second contact point 47, and the third contact point 48, and the common contact point 49. At least one of the first heating element 51, the pair of second heating elements 52, and the third heating element 53 generates heat. The control unit 6 independently controls the heat generation of the first heating element 51, the pair of second heating elements 52, and the third heating element 53.

Figure 5:
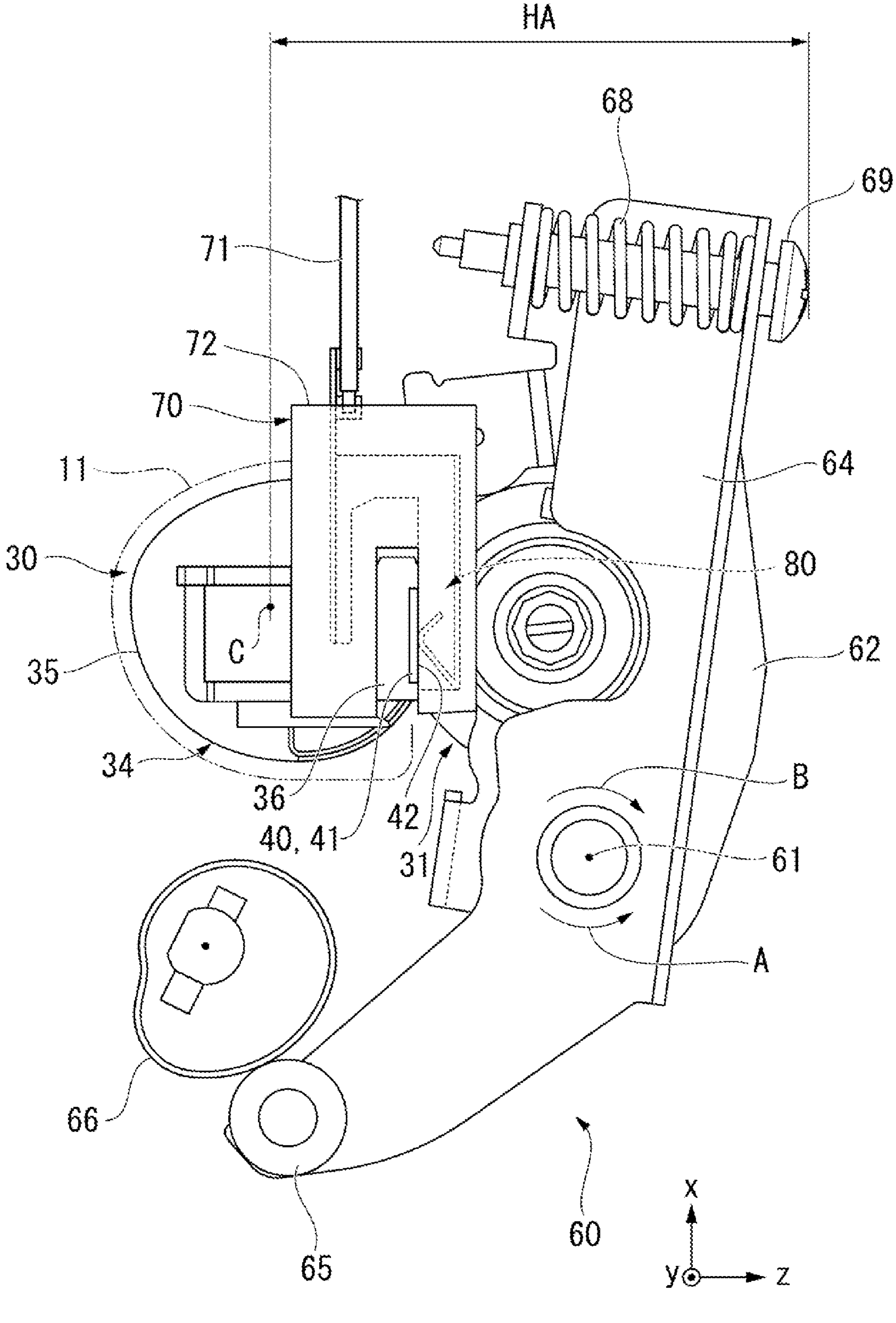
FIG. 5 is a front view of a connector member according to a first embodiment.

FIG. 5 is a front view of a connector member 70 according to a first embodiment.

A pressure roller support mechanism 60 and a tubular film holding member 11 are in both end portions of the fixing device 30 in the y direction.

The pressure roller support mechanism 60 is in both end portions of the pressure roller 31 in the y direction. The pressure roller support mechanism 60 changes the relative position of the pressure roller 31 with respect to the heating roller 34 while supporting the pressure roller 31. The pressure roller support mechanism 60 comprises an arm 62, a pusher 64, a coil spring 68, a pin 69, and a cam 66.

The arm 62 rotatably supports the pressure roller 31. The arm 62 is capable of turning around an arm turning center 61. The pusher 64 is capable of turning around the arm turning center 61 independently of the arm 62. The coil spring 68 is between the arm 62 and the pusher 64 in a compressed state. The coil spring 68 urges the arm 62 in the direction in which the pressure roller 31 abuts against the heating roller 34. The pin 69 is coaxial with the coil spring 68. The pin 69 is fixed to the arm 62. The head portion of the pin 69 is located on the +z direction side of the pusher 64. The cam 66 abuts against a cam follower 65 mounted on the pusher 64.

If the cam 66 pushes the cam follower 65, the pusher 64 turns in the arrow A direction. The pusher 64 presses the arm 62 in the −z direction via the coil spring 68. The arm 62 turns in the arrow A direction, and the pressure roller 31 abuts against the heating roller 34. If the pusher 64 further turns in the arrow A direction, the pusher 64 is separated from the head portion of the pin 69 and compresses the coil spring 68. The coil spring 68 strongly presses the arm 62 in the −z direction. The pressure roller 31 is pressed toward the heating roller 34, and the nip N is formed. In this state, the fixing work of the fixing device 30 is carried out.

If the cam 66 is separated from the cam follower 65, the pusher 64 is turned in the arrow B direction by the restoring force of the coil spring 68. The pusher 64 abuts against the head portion of the pin 69, and the gap between the arm 62 and the pusher 64 is fixed. The arm 62 turns in the arrow B direction together with the pusher 64. The pressure roller 31 is separated from the heating roller 34, and the nip N is released. In this state, the paper jam in the fixing device 30 is cleared. The fixing device 30 shifts to a sleep state.

The tubular film holding member 11 is in both end portions of the tubular film 35 of the heating roller 34 in the y direction. The outer shape of the tubular film holding member 11 is larger than the outer shape of the tubular film 35. The tubular film holding member 11 regulates the y-direction movement of the tubular film 35. The tubular film holding member 11 has a protruding portion inserted inside the tubular film 35. The tubular film holding member 11 holds the tubular film 35 in a predetermined tubular shape.

First Embodiment

The connector member 70 of a first embodiment will be described.

As illustrated in FIG. 5, both end portions of the heating unit 40 and the support member 36 of the heating roller 34 (hereinafter, referred to as the heating unit 40 and so on in some cases) in the y direction are outside the tubular film holding member 11 in the y direction. The connector member 70 is mounted on both end portions of the heating unit 40 and so on in the y direction. The connector member 70 mounted on the end portion in the −y direction energizes the first contact point 46 and the second contact point 47 of the heating unit 40. The connector member 70 mounted on the end portion in the +y direction energizes the third contact point 48 and the common contact point 49 of the heating unit 40.

When viewed from the y direction, the connector member 70 is formed in a U shape and has an opening on the −x direction side. The heating unit 40 and so on are disposed inside the U shape of the connector member 70. The connector member 70 moves in the −x direction and is mounted on the heating unit 40 and so on.

Figure 6:
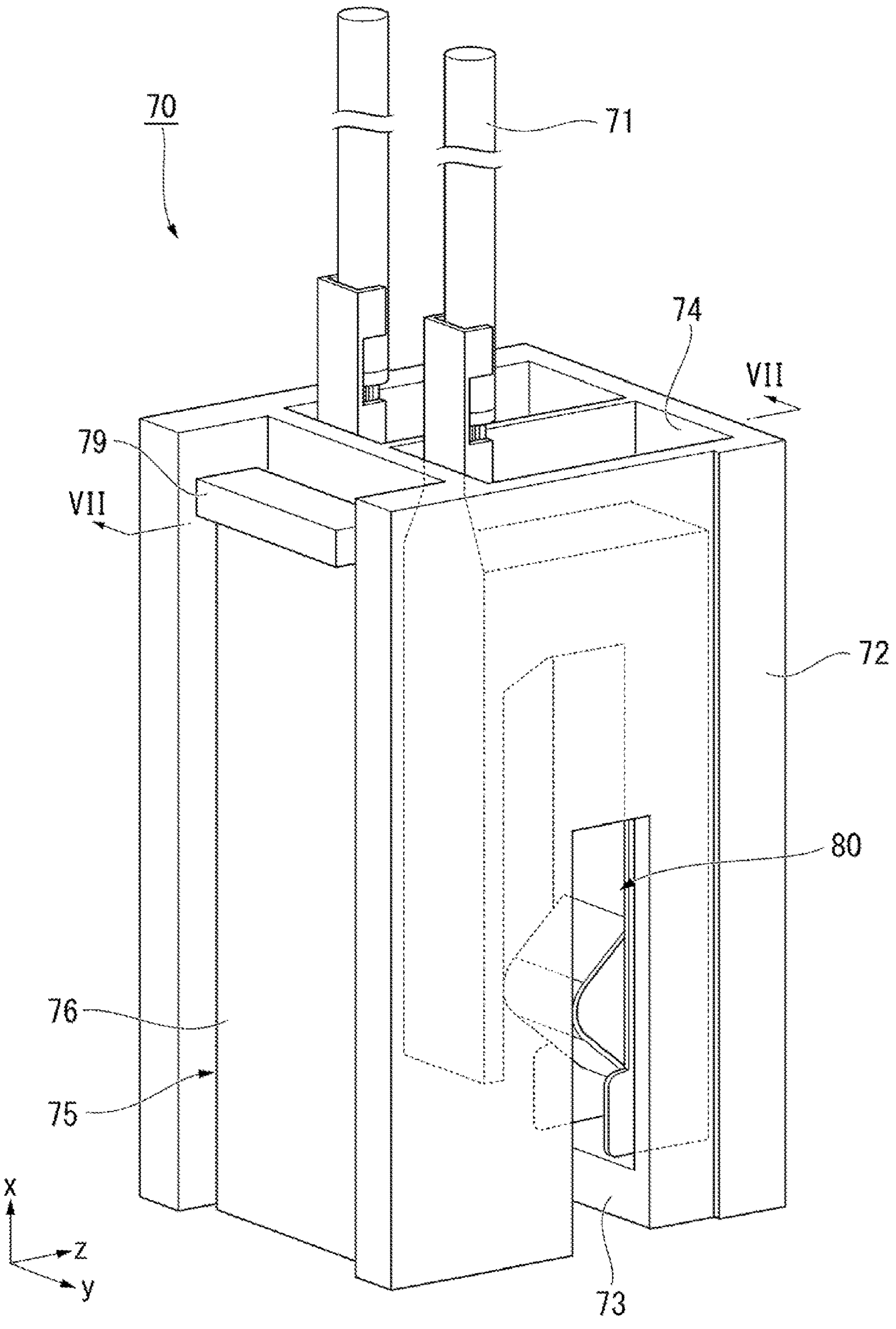
FIG. 6 is a perspective view of a connector member.

FIG. 6 is a perspective view of the connector member 70. The connector member 70 comprises a cover 72 and a pair of a conducting wire 71 and an energizing terminal 80.

The cover 72 is formed of a resin material or the like. A recessed portion 73 storing the heating unit 40 and so on is formed in the end portion of the cover 72 in the −x direction. The recessed portion 73 penetrates the cover 72 in the y direction. The cover 72 has a pair of openings 74 for storing the energizing terminals 80. The pair of openings 74 are arranged in the y direction. The openings 74 open toward the +x direction. Each of the energizing terminals 80 moves along the −x direction and is stored in the corresponding accommodating portion 74.

Figure 7:
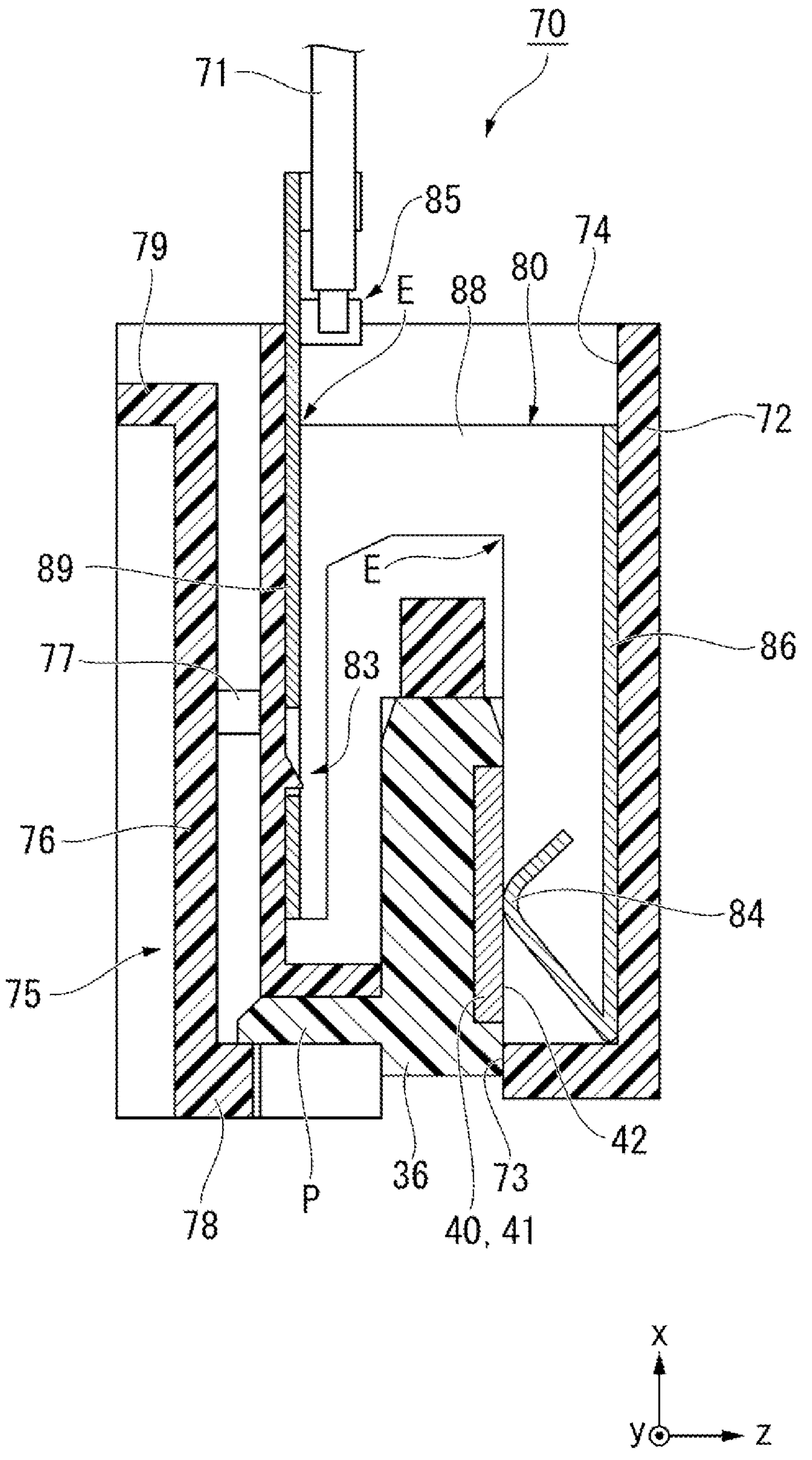
FIG. 7 is a cross-sectional view of a connector member.

FIG. 7 is a cross-sectional view of the connector member 70 taken along line VII-VII of FIG. 6. The cover 72 has a holding mechanism 75 of the support member 36 in the end portion in the −z direction. The holding mechanism 75 is formed integrally with the cover 72. The holding mechanism 75 comprises a base plate 76, a base plate support portion 77, an engaging portion 78, and a pressing portion 79. The base plate 76 is parallel to the xy plane. The base plate support portion 77 is in the middle portion of the base plate 76 in the z direction and in the x direction. The engaging portion 78 is disposed at the end portion of the base plate 76 in the −x direction and protrudes toward the +z direction from the base plate 76. The pressing portion 79 is disposed at the end portion of the base plate 76 in the +x direction and protrudes toward the −z direction from the base plate 76.

The pressing portion 79 is pressed toward the +z direction. The base plate 76 inclines with the base plate support portion 77 serving as a fulcrum. The engaging portion 78 moves toward the −z direction. With the pressing portion 79 pressed, the support member 36 is inserted into the recessed portion 73 of the cover 72 along the +x direction. The support member 36 has a protrusion P protruding toward the −z direction. When the pressing portion 79 is released, the engaging portion 78 returns to the original position (i.e., moves toward the +z direction) so as to engage with the protrusion P of the support member 36. The support member 36 is held by the holding mechanism 75, and disconnection of the connector member 70 from the support member 36 is suppressed.

The conducting wire 71 is a conductor covered with an insulator. The conducting wire 71 leads out from the energizing terminal 80 in the +x direction. The end portion of the conducting wire 71 on the energizing terminal 80 side has a straight line shape parallel to the x direction. The insulator is removed and the conductor is exposed at the end portion of the conducting wire 71 in the −x direction.

Figure 8:
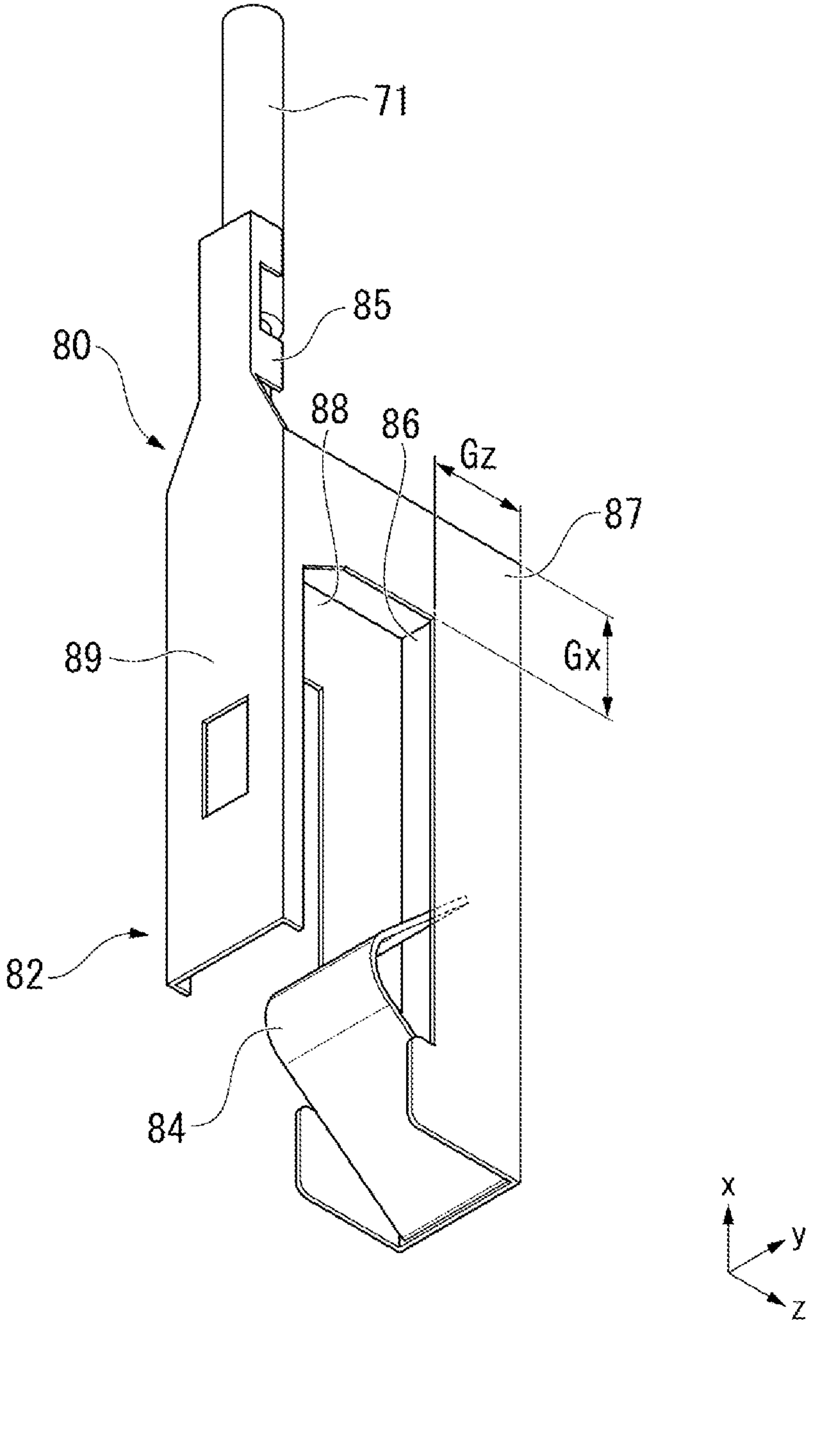
FIG. 8 is a perspective view of an energizing terminal.

FIG. 8 is a perspective view of the energizing terminal 80. The energizing terminal 80 comprises a front surface portion 86, a pair of side surface portions 87 and 88, and a back surface portion 89. When viewed from the x direction, the outer shape of the energizing terminal 80 is a quadrangular shape having four sides corresponding to the front surface portion 86, the pair of side surface portions 87 and 88, and the back surface portion 89.

The pair of side surface portions 87 and 88 are parallel to the xz plane. The pair of side surface portions 87 and 88 are separated in the y direction. The pair of side surface portions 87 and 88 have a U shape that opens towards the −x direction. A width Gx of the pair of side surface portions 87 and 88 in the x direction is larger than a width Gz in the z direction.

The front surface portion 86 is parallel to the xy plane. The front surface portion 86 is at the end portion of the energizing terminal 80 in the +z direction. The back surface portion 89 is parallel to the xy plane. The back surface portion 89 is at the end portion of the energizing terminal 80 in the −z direction. The front surface portion 86 and the back surface portion 89 are parallel to the first surface 42 of the substrate 41 of the heating unit 40.

The energizing terminal 80 is formed by bending an initially flat plate-like material such as a steel plate. The pair of side surface portions 87 and 88 extend toward the +z direction from the back surface portion 89 and then bend and extends along the x direction. The front surface portion 86 is between the pair of side surface portions 87 and 88 and bends in the xy plane. The end portions of the front surface portion 86 in the y direction abuts against the +z-direction end portion of each of the side surface portions 87 and 88. The abutting portion between the end portions of the front surface portion 86 in the y direction and the +z-direction end portion of each of the side surface portions 87 and 88 are joined by caulking or the like.

A reinforcing portion 82 is formed by the back surface portion 89 and the pair of side surface portions 87 and 88 continuous with the back surface portion 89. The reinforcing portion 82 is disposed on the side opposite to a contact portion 84 with the first surface 42 of the substrate 41 interposed therebetween. The cross section of the reinforcing portion 82 perpendicular to the x direction has a U shape. The reinforcing portion 82 increases the strength of the energizing terminal 80.

The energizing terminal 80 has the contact portion 84 and a connecting portion 85. The contact portion 84 comes into contact with the contact point of the heating unit 40 and energizes the heating elements 50. The contact portion 84 is formed by bending the tip portion in the −x direction of the front surface portion 86 toward the −z and +x directions and further bending the tip portion toward the +z and +x directions. The contact portion 84 tapers in the −z direction when viewed from the y direction. The end portion of the contact portion 84 in +x direction does not contact any surface.

The connecting portion 85 is connected to the conducting wire 71. The connecting portion 85 is at the end portion of the back surface portion 89 in the +x direction. The connecting portion 85 is formed by bending toward the +z direction a pair of arm portions of the back surface portion 89 in the y direction. T pair of the arm portions are arranged along the x direction. The arm portion in the +x direction holds the part of the conducting wire 71 covered with the insulator. The arm portion in the −x direction holds the insulator-removed part of the conducting wire 71. The conducting wire 71 and the energizing terminal 80 are conductively connected by the arm portion in the −x direction.

As illustrated in FIG. 7, the energizing terminal 80 is stored in the opening 74 of the cover 72. The relative position between the energizing terminal 80 and the cover 72 is regulated by a locking portion 83. The contact portion 84 of the energizing terminal 80 is on the +z direction size of the recessed portion 73 of the cover 72. The substrate 41 of the heating unit 40 is stored in the recessed portion 73. The contact portion 84 comes into contact with the contact point of the heating elements 50 on the first surface 42 of the substrate 41. The connecting portion 85 of the energizing terminal 80 is on the −z direction side of the recessed portion 73 of the cover 72. The energizing terminal 80 has a plurality of bent portions E between the connecting portion 85 and the contact portion 84. The contact portion 84 and the connecting portion 85 are on opposite sides with the first surface 42 of the substrate 41 interposed therebetween.

A force in the −x direction may act on the connecting portion 85 from the conducting wire 71. This force acts in the direction in which the connector member 70 is pulled out of the heating unit 40 and so on. The connecting portion 85 is on the side opposite to the contact portion 84 with the first surface 42 of the substrate 41 interposed therebetween. The force acting on the connecting portion 85 causes the connector member 70 to generate a moment of force in the xz plane. The moment increases the frictional force between the heating unit 40 and so on and the connector member 70. Disconnection of the connector member 70 from the heating unit 40 and so on is prevented. The moment increases the frictional force between the energizing terminal 80 and the cover 72. Disconnection of the energizing terminal 80 from the cover 72 is prevented.

The connecting portion 85 is on the side opposite to the contact portion 84 with the first surface 42 of the substrate 41 interposed therebetween. The conducting wire 71 is on the −z direction size of the first surface 42 near the center C of the heating roller 34. As illustrated in FIG. 5, the pressure roller 31 and the pressure roller support mechanism 60 are on the +z direction side of the first surface 42. Since the conducting wire 71 is near the center C of the heating roller 34, the pressure roller support mechanism 60 can also be disposed near the heating roller 34. The fixing device 30 is reduced in size since a distance HA between the center C of the heating roller 34 and the head portion of the pin 69 of the pressure roller support mechanism 60 is small.

As described above, the connector member 70 of the first embodiment has an energizing terminal 80 and a conducting wire 71. The energizing terminal 80 has the contact portion 84 capable of coming into contact with the contact point 45 of the heating element 50 on the first surface 42 of the substrate 41 of the heating unit 40. The conducting wire 71 is connected to the energizing terminal 80 in the connecting portion 85 on the side opposite to the contact portion 84 with the first surface 42 interposed therebetween.

Disconnection of the connector member 70 from the heating unit 40 and so on is prevented. The connector member 70 vibrates by the pressure roller 31 abutting against and being separated from the heating roller 34. Even in this case, the contact of the contact portion 84 of the connector member 70 with the contact point 45 of the heating unit 40 is maintained. The fixing device 30 is reduced in size.

The fixing device 30 has the pressure roller 31 on the first surface 42 side of the substrate 41. Since the conducting wire 71 is disposed near the center C of the heating roller 34, the pressure roller support mechanism 60 can also be disposed near the heating roller 34. The fixing device 30 is reduced in size.

The connector member 70 can be mounted on the substrate 41 and further has the cover 72 that stores the energizing terminal 80. The contact between the contact point 45 of the heating unit 40 and the contact portion 84 of the energizing terminal 80 is held by the cover 72.

The end portion of the conducting wire 71 on the connecting portion 85 side has a straight line shape. The posture of the conducting wire 71 is stable, and interference with a peripheral member is suppressed.

The energizing terminal 80 is formed by bending a plate material. The energizing terminal 80 is formed inexpensively.

The energizing terminal 80 has the plurality of bent portions E between the connecting portion 85 and the contact portion 84. The connecting portion 85 is disposed on the side opposite to the contact portion 84 with respect to the first surface 42.

The energizing terminal 80 has the reinforcing portion 82 on the side opposite to the contact portion 84 with the substrate 41 interposed therebetween. The reinforcing portion 82 increases the strength of the energizing terminal 80.

The energizing terminal 80 has the back surface portion 89 and the pair of side surface portions 87 and 88. The back surface portion 89 is on the side opposite to the contact portion 84 with the substrate 41 interposed therebetween and is parallel to the first surface 42. The pair of side surface portions 87 and 88 extends toward the +z direction from the back surface portion 89 and then bends and extends along the x direction. The rigidity of the energizing terminal 80 increases since the energizing terminal 80 is formed by bending the pair of side surface portions 87 and 88 from the back surface portion 89.

The connecting portion 85 is at the end portion of the back surface portion 89 in the +x direction. Since the connecting portion 85 is at the end portion of the highly rigid back surface portion 89, the posture and conductive connection of the conducting wire 71 are maintained.

Second Embodiment

A connector member 90 according to a second embodiment will be described.

Figure 9:
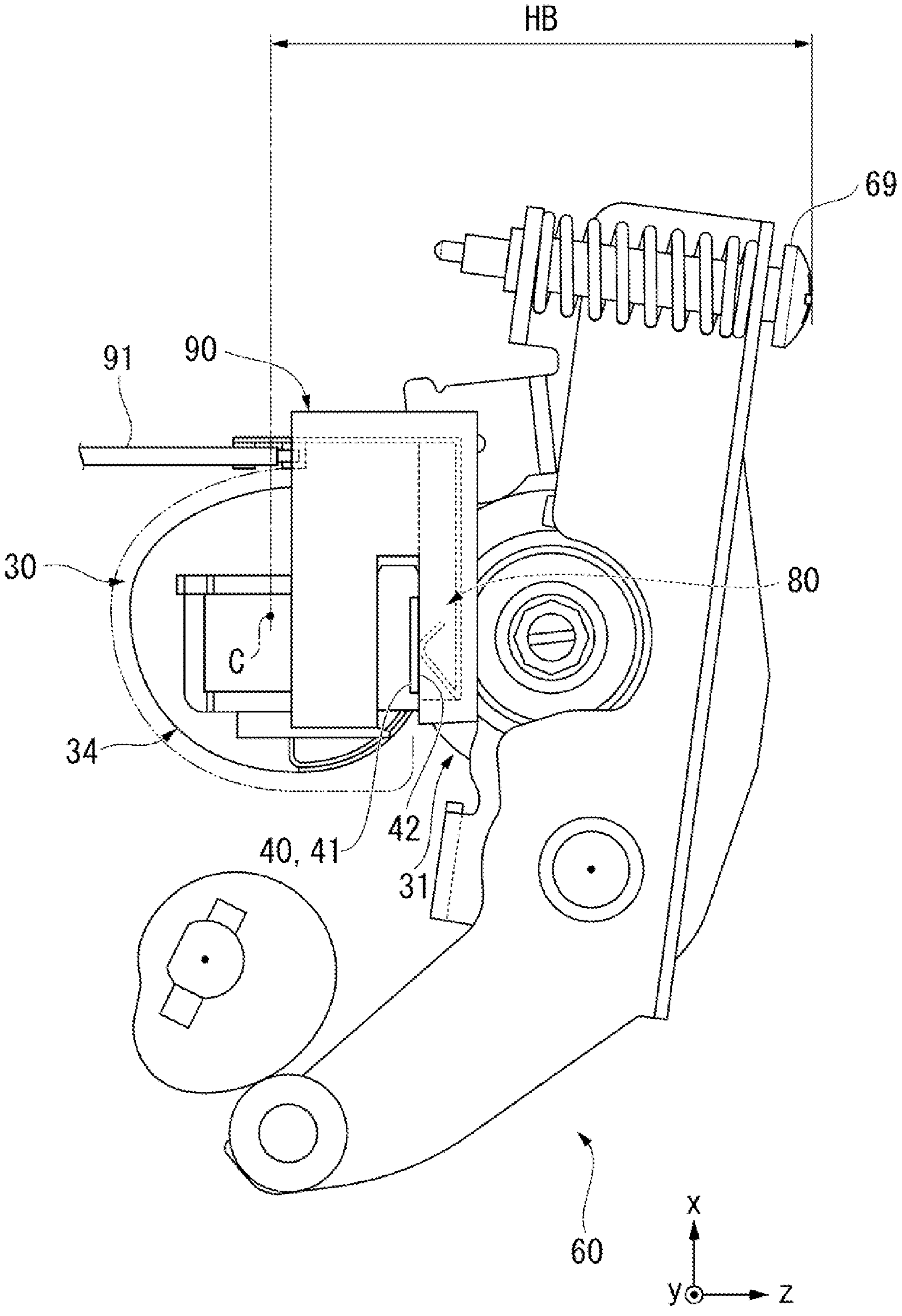
FIG. 9 is a front view of a connector member according to a second embodiment.
Figure 10:
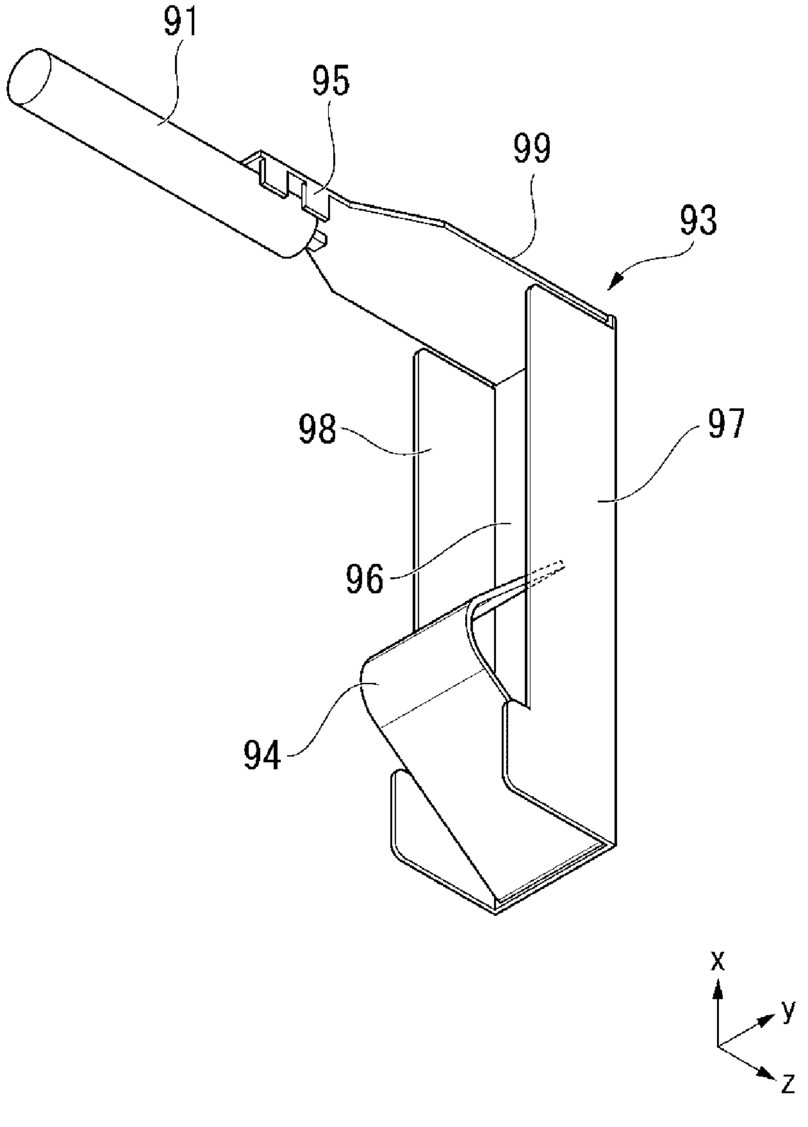
FIG. 10 is a perspective view of an energizing terminal.

FIG. 9 is a front view of the connector member 90 according to the second embodiment. FIG. 10 is a perspective view of an energizing terminal 93. The connector member 90 according to the second embodiment is different from the connector member 70 of the first embodiment in that a conducting wire 91 is lead out of a connecting portion 95 of the energizing terminal 93 in the −z direction. Descriptions of the second embodiment regarding points shared with the first embodiment may be omitted.

The energizing terminal 93 has a front surface portion 96, a pair of side surface portions 97 and 98, and an upper surface portion 99. The front surface portion 96 is parallel to the xy plane. The front surface portion 96 is at the end portion of the energizing terminal 93 in the +z direction. The pair of side surface portions 97 and 98 are parallel to the xz plane. The pair of side surface portions 97 and 98 are separated in the y direction. The upper surface portion 99 is parallel to the yz plane. The upper surface portion 99 is at the end portion of the energizing terminal 93 in the +x direction.

The energizing terminal 93 is formed by bending a plate material such as a steel plate. The pair of side surface portions 97 and 98 extends toward the −z direction from both end portions of the front surface portion 96 in the y direction. The upper surface portion 99 extends toward the −z direction from the end portion of the front surface portion 96 in the +x direction.

The energizing terminal 93 has a contact portion 94 and the connecting portion 95. The connecting portion 95 is connected to the conducting wire 91. The connecting portion 95 is at the end portion of the upper surface portion 99 in the −z direction. The conducting wire 91 is lead out of the connecting portion 95 in the −z direction. The end portion of the conducting wire 91 on the connecting portion 95 side has a straight line shape parallel to the z direction.

A force in the −z direction may act on the connecting portion 95 from the conducting wire 91. The connecting portion 95 is on the side opposite to the contact portion 94 with the first surface 42 of the substrate 41 of the heating unit 40 interposed therebetween. The force acting on the connecting portion 95 causes the connector member 90 to generate a moment of force in the xz plane. The moment increases the frictional force between the heating unit 40 and so on and the connector member 90. Disconnection of the connector member 90 from the heating unit 40 and so on is prevented.

The connecting portion 95 is on the side opposite to the contact portion 94 with the first surface 42 of the substrate 41 interposed therebetween. The conducting wire 91 is on the −z direction side of the first surface 42 near the center C of the heating roller 34. As illustrated in FIG. 9, the pressure roller 31 and the pressure roller support mechanism 60 are on the +z direction side of the first surface 42. Since the conducting wire 91 is near the center C of the heating roller 34, the pressure roller support mechanism 60 can also be disposed near the heating roller 34. The fixing device 30 is reduced in size since a distance HB between the center C of the heating roller 34 and the head portion of the pin 69 of the pressure roller support mechanism 60 is small.

As described above, the conducting wire 91 is lead out of the connecting portion 95 in the −z direction. The −z direction intersects with the first surface 42 parallel to the xy plane.

Disconnection of the connector member 90 from the heating unit 40 is prevented. The fixing device 30 is reduced in size.

According to at least one of the embodiments described above, the connecting portion 85 (or 95) is on the side opposite to the contact portion 84 (or 94) with the first surface 42 of the substrate 41 interposed therebetween, and thus disconnection of the connector member 70 (or 90) from the heating unit 40 is prevented.

While certain embodiments have been described, these embodiments have been presented by way of example only, and are not intended to limit the scope of the inventions. Indeed, the novel embodiments described herein may be embodied in a variety of other forms: furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A connector member connectable to a heating unit of a fixing device, the connector member comprising:

a cover having a recess into which an end part of the heating unit in a first direction that is parallel to a rotation axis of a heating roller can be inserted in a second direction crossing the first direction; and an energizing terminal stored in the cover and including:

a contact portion on a first side of the energizing terminal in a third direction to contact a contact point on the end part in the recess, the third direction crossing the first direction and the second direction, and a connecting portion on a second side of the energizing terminal opposite to the first side in the third direction across the end part in the recess, the connecting portion being connected to a conducting wire for receiving electric power, wherein the energizing terminal contacts the end part in the recess only on the first side thereof and does not contact any member in the recess on the second side thereof.

2. The connector member according to claim 1, wherein a pressure roller contacts the heating roller from the first side of the recess.

3. The connector member according to claim 1, wherein an end portion of the conducting wire connected to the connecting portion is a straight line portion.

4. The connector member according to claim 1, wherein the energizing terminal is a bent plate structure.

5. The connector member according to claim 1, wherein the energizing terminal has a plurality of bent portions between the connecting portion and the contact portion.

6. The connector member according to claim 1, wherein the energizing terminal has a reinforcing portion on the second side of the recess.

7. The connector member according to claim 6, wherein the energizing terminal further includes:

a back surface portion extending along the second direction and connected to the connecting portion, and a pair of side surface portions each connected to an end of the back surface portion in the second direction and extending in the third direction.

8. The connector member according to claim 7, wherein the connecting portion is at an end portion of the back surface portion in the second direction.

9. The connector member according to claim 1, wherein the conducting wire is connected to the connecting portion in the second direction.

10. The connector member according to claim 1, wherein the conducting wire is connected to the connecting portion in the third direction.

11. A fixing device, comprising:

a heating roller including a heating unit and configured to rotate about a rotation axis extending in a first direction; and a connector member connected to the heating unit and including:

a cover having a recess into which an end part of the heating unit in the first direction is inserted in a second direction crossing the first direction, and an energizing terminal stored in the cover and including:

a contact portion on a first side of the energizing terminal in a third direction to contact a contact point on the end part in the recess, and a connecting portion on a second side of the energizing terminal opposite to the first side in the third direction across the end part in the recess, the connecting portion being connected to a conducting wire for receiving electric power, wherein the energizing terminal contacts the end part in the recess only on the first side thereof and does not contact any member in the recess on the second side thereof.

12. The fixing device according to claim 11, further comprising:

a pressure roller that contacts the heating roller from the first side of the recess.

13. The fixing device according to claim 11, wherein an end portion of the conducting wire connected to the connecting portion is a straight line portion.

14. The fixing device according to claim 11, wherein the energizing terminal is a bent plate structure.

15. The fixing device according to claim 11, wherein the energizing terminal has a plurality of bent portions between the connecting portion and the contact portion.

16. The fixing device according to claim 11, wherein the energizing terminal has a reinforcing portion on the second side of the recess.

17. The fixing device according to claim 16, wherein the energizing terminal further includes:

a back surface portion extending along the second direction and connected to the connecting portion, and a pair of side surface portions each connected to an end of the back surface portion in the second direction and extending in the third direction.

18. The fixing device according to claim 17, wherein the connecting portion is at an end portion of the back surface portion in the second direction.

19. The fixing device according to claim 11, wherein the end part of the heating unit in the recess includes a first outer surface exposed to the first side of the energizing terminal and including the contact point and a second outer surface exposed to the second side of the energizing terminal, and the second outer surface of the end part is not in contact with any part of the energizing terminal.

20. The fixing device according to claim 11, wherein the end part of the heating unit in the recess includes a substrate facing the first side of the energizing terminal and a supporting member facing the second side of the energizing terminal, and the energizing terminal on the second side is not in contact with the supporting member.

* * * * *